May 3, 1927.  
J. D. LALOR  
1,627,186  
FLUID STRAINING APPARATUS  
Filed Feb. 18, 1925  2 Sheets-Sheet 1
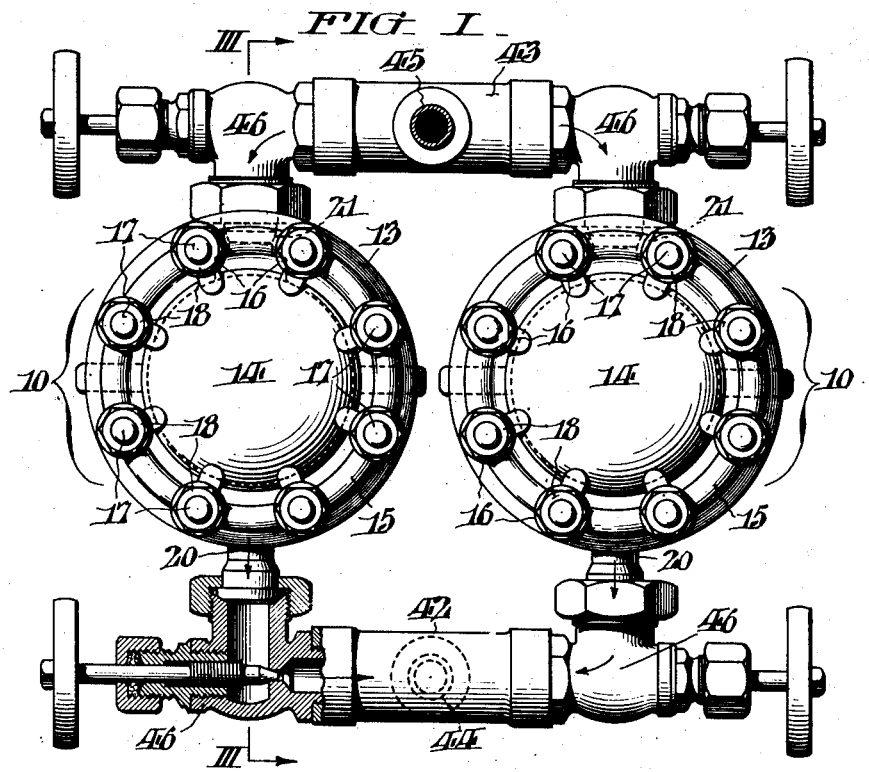
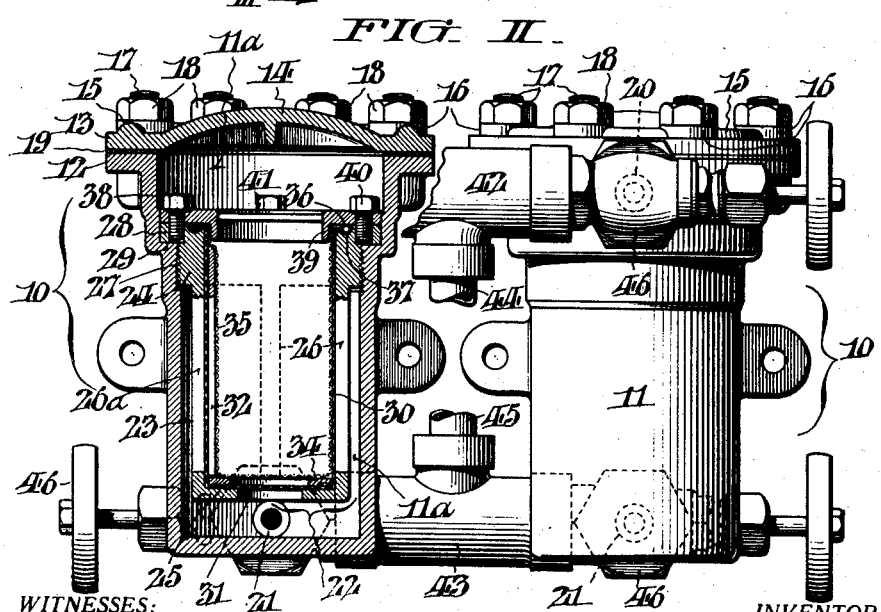
WITNESSES:  
INVENTOR:  
James D. Lalor,  
BY  
ATTORNEYS.

May 3, 1927.
J. D. LALOR
1,627,186
FLUID STRAINING APPARATUS
Filed Feb. 18, 1925  2 Sheets-Sheet 2
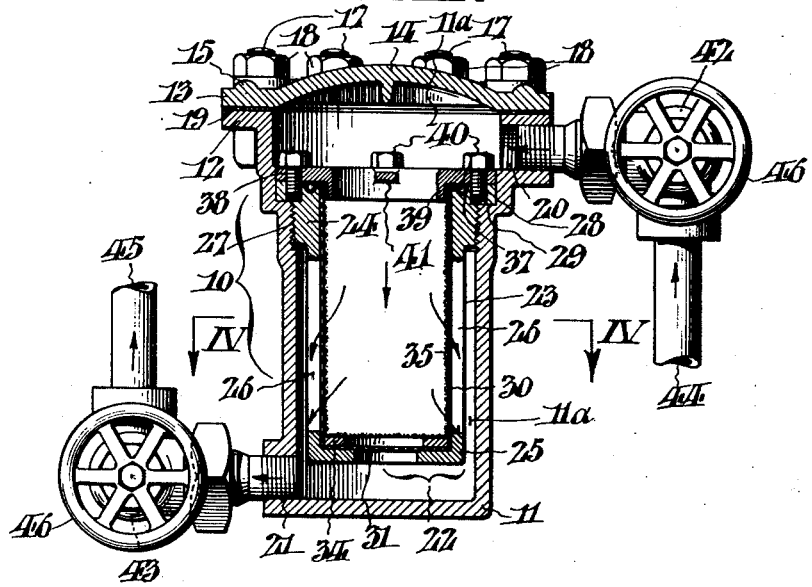
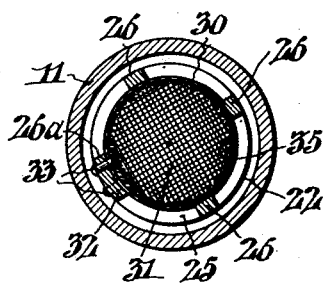
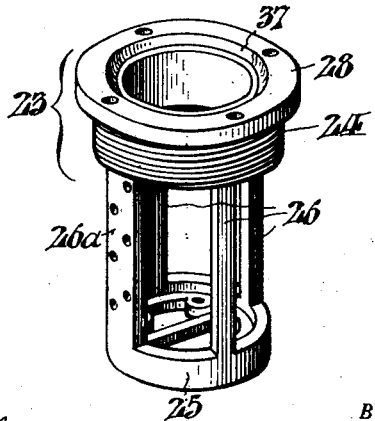
WITNESSES
INVENTOR:
James D. Lalor,
BY
ATTORNEYS.

Patented May 3, 1927.

1,627,186

UNITED STATES PATENT OFFICE.

JAMES D. LALOR, OF BALTIMORE, MARYLAND, ASSIGNOR TO THE LALOR FUEL OIL SYSTEM COMPANY, INC., OF BALTIMORE, MARYLAND, A CORPORATION OF MARYLAND.

FLUID-STRAINING APPARATUS.

Application filed February 18, 1925. Serial No. 10,047.

This invention relates to straining apparatus,—more particularly to a type intended for continuous operation in straining a steady flow of fluid, and embodying a number of component straining units capable of interchangeable use to permit substitution of one for another temporarily incapacitated after continued service through clogging. Such an apparatus is useful in oil burning systems, and especially as a second or final straining means in association with filtering apparatus of the kind shown and described in my copending application Serial No. 10,046 filed simultaneously herewith, to insure removal of any very small particles of solid or congealed matter not previously caught in the primary filtering means. The observance of this final precaution is absolutely essential in oil burning systems employing high pressure burners with exceedingly minute spray discharge orifices, to preclude the possibility of the latter becoming choked.

The main objects of my present invention are to provide in connection with apparatus of the character above referred to, straining units that are simple in construction; absolutely reliable in operation; of ample sturdiness to withstand fluid flow at high pressures; and capable of being easily and quickly disassembled for cleaning and replacement of the filtering material as required from time to time.

Other objects and advantages will be readily apparent from the detailed description hereinafter of the typical embodiment of my invention shown in the drawings.

Fig. I is a plan view with certain portions in section.

Fig. II is a vertical elevation with one of the straining units in section.

Fig. III is a sectional view taken as indicated by the arrows III—III in Fig. I.

Fig. IV is a plan section taken as indicated by the arrows IV—IV in the immediately preceding elevation; and Fig. V is a perspective view of the frame of the removable filtering element.

The organization chosen for illustration herein is characterized by two independent component straining units 10; and since these units are exact counterparts of one another, it will be more convenient, for the sake of brevity, to refer to them in the singular for the time being in the following description. As shown, each unit 10 comprises a vertical cylindric casing 11 which is closed at the bottom, and formed about its open top with a projecting head flange 12 for placement of a detachable cover 13. For greater rigidity, this cover 13 is centrally domed or arched as at 14, and otherwise strengthened by a circular ridge 15 that joins a series of bosses 16 pierced for passage of stud bolts 17 projecting upward from the head flange 12 of the casing 11. Nuts 18 engaging the bolts 17 function to clamp the cover 13 in place; while a compressible gasket 19 is interposed to insure a fluid-tight juncture between the casing parts. The fluid being strained is introduced into the flow chamber $11^a$ within the casing 11, through a port 20 near the top, and discharges through a port 21 near the bottom and at the opposite side of said chamber.

Disposed in the fluid flow within the chamber $11^a$, intermediate the inlet 20 and outlet 21, is a straining element 22 describable, in a general way, as being of basket-like configuration. The outer member 23 of this straining element 22 has the form of a skeletonized frame, (see Fig. V) with top and bottom rings 24, 25 united at circumferential intervals by integral verticals 26, one of which, designated $26^a$, being perforated along opposite side edges for a purpose to be presently explained. The upper or larger ring 24 is in screw-threaded engagement with the casing at 27, and has a peripheral flange 28, which, in the assemblage, seats or rests upon an internal circumferential shoulder 29 in said casing located at a level somewhat below the inlet port 20, see Fig. III. The member 23 has a foraminous lining 30, and is provided with a bottom 31 of like material. The lining 30 is preferably constructed from flat sheet metal, the blank being cut to such length as to predetermine, when bent to form, a cylinder of the proper diameter with the ends of the sheet abutting as in Fig. IV. In assembling, the line of abutment is brought into registry with the medial of the perforated vertical 26ᵃ of the member 23, a strip 32 superposed to lap the joint, whereupon the parts are rigidly secured by rivets or other securing means 33 in accordance with the disclosure in the illustration last referred to. A ring 34 is employed to secure the bottom 31 in an identical manner, as best shown in Fig. III. By this construction, I provide a substantial backing capable of bracing and thus protecting an inner lining 35 of finely woven filtering fabric against the pressure of the fluid flow which is maintained in the direction indicated by the arrows in Fig. III. The lining 35 is preferably made in the form of a bag with a reinforcing bead 36 formed about its mouth by incorporation of a metallic hoop see Fig. II, said bead being accommodated in a circular groove or seat 37 in the top face of the flange 28 of the member 23. The bag 35 is held in place by a retaining annulus 38 with a depending circumferential lip 39 that laps a considerable internal margin of the bag mouth, and said bag is—in part—supported in spacial relation relative to the foraminous lining bottom 31 by the ring 34 to prevent clogging of said bottom by collected sediment. Any convenient fastening means such as cap bolts 40 may be employed to securely clamp the retaining annulus 38 tightly in place over the bead 36 around the bag mouth. For convenience and ease in removing the straining element as a whole from the casing 10, the annulus 38 is provided with a diametral bar 41 designed to serve as a hand grasp.

Assuming the operation of the filter units 10 to be obvious from the foregoing, I will now proceed to describe the manner in which they are grouped in the organization to permit of their being interchangeably used; or, in other words, that the system in which the apparatus is interposed can be continuously operated by running the flow through one of said units while the other is being cleaned or its inner lining replaced as may be required from time to time. Accordingly, the inlets 20 and outlets 21 of the units are coordinated by common manifolds 42, 43 which are in turn connected to flow mains 44, 45. Angle valves 46 serve in the present instance as couplings between the inlets 20 and outlets 21 and the manifolds 42, 43, as well as the means for individually cutting in or cutting out the units 10 in a manner that will at once be apparent to those schooled in the operation of apparatus of the class to which the present invention belongs.

Having thus described my invention, I claim:

1. A fluid straining apparatus characterized by component interchangeable units each comprising a casing affording a flow chamber for the fluid, and a straining element in the form of a foraminous basket disposed in the fluid flow in the chamber, said straining element embodying a removable inner lining of textile fabric with its bottom in spaced relation to that of the basket to prevent clogging of the latter by collected matter, and said straining element having screw connection with the casing so as to be readily removable therefrom.

2. A fluid straining apparatus characterized by component interchangeable units each comprising a casing affording a flow chamber for the fluid, and a removable strainer element disposed in the fluid flow within the chamber having the form of a foraminous basket with a securing ring in the bottom thereof functional to hold the wall expanded, and including a separately-removable lining bag of textile fabric with a reinforcing bead about its mouth adapted to be secured around the opening of the basket and the bottom of said lining bag—in part— seating on the securing ring whereby clogging of the foraminous basket bottom with collected matter is prevented.

3. A fluid straining apparatus characterized by component interchangeable units each comprising a casing affording a flow chamber for the fluid, and a removable straining element disposed in the fluid flow within the chamber having the form of a foraminous basket, and including a separately-removable lining bag of textile fabric with a reinforcing bead about its mouth adapted to seat in a circumferential groove around the top of the basket, and a detachable annulus to clamp the bead aforesaid in its groove.

4. A fluid straining apparatus characterized by component interchangeable units each comprising a casing affording a flow chamber for the fluid, in combination with a strainer element in the form of a foraminous basket having a securing ring within its lower part and a removable inner lining of textile fabric disposed intermediate inlet and outlet ports at the top and bottom of the casing; said lining being supported in spacial relation relative to the basket bottom by the securing ring aforesaid to prevent clogging of the latter with strained matter.

5. A fluid straining apparatus characterized by component units each comprising a vertical cylindric casing affording a flow chamber for the fluid, said casing having a detachable cover and being formed near the top with a circumferential internal shoulder, in combination with a straining element in the form of a basket including a skeletonized outer member screwed, to enable removal of the element, into the casing and formed about its top with a lateral peripheral flange adapted to seat upon the circumferential shoulder aforementioned, a foraminous sheet metal lining secured within the skeletonized member, a separately-removable inner lining bag for the basket of textile fabric with a reinforcing bead about the mouth thereof adapted to be received in a circumferential groove around the top of the skeletonized member, and a detachable annulus to clamp the bead in its groove, said annulus being formed with a diametral bar serviceable as a grasp in removing the straining element from the casing.

In testimony whereof, I have hereunto signed my name at Philadelphia, Pennsylvania, this 13th day of February, 1925.

JAMES D. LALOR.